United States Patent

Bourghelle et al.

[11] Patent Number: 5,828,071
[45] Date of Patent: Oct. 27, 1998

[54] APPARATUS FOR CURING BY UV RADIATION

[75] Inventors: Patrick Bourghelle, Saint-Denis; Christopher McNutt, Saint Germain en Laye, both of France

[73] Assignee: Alcatel Cable, Clichy Cedex, France

[21] Appl. No.: 583,803

[22] Filed: Jan. 5, 1996

[30] Foreign Application Priority Data

Jan. 6, 1995 [FR] France ................................ 95 00116

[51] Int. Cl.⁶ .................................................. G01N 21/00
[52] U.S. Cl. ........................................................ 250/492.1
[58] Field of Search ........................... 250/455.11, 492.1; 427/513

[56] References Cited

U.S. PATENT DOCUMENTS

| | | | |
|---|---|---|---|
| 4,212,835 | 7/1980 | Koros | 261/116 |
| 4,636,405 | 1/1987 | Mensah et al. | 427/54.1 |
| 5,092,264 | 3/1992 | Overton et al. | 250/492.1 |
| 5,171,609 | 12/1992 | Ury | 427/513 |
| 5,334,421 | 8/1994 | McNutt | 427/513 |
| 5,418,369 | 5/1995 | Moore et al. | 250/492.1 |

FOREIGN PATENT DOCUMENTS 2 629 187 A1   9/1989   France.

OTHER PUBLICATIONS

Patent Abstracts of Japan, vol. 013 No. 101 (C–574), 9 Mar. 1989 corresponding to JP–A–63 277539 (Furukawa Electric Co.—15 Nov. 1988.

*Primary Examiner*—Bruce Anderson
*Attorney, Agent, or Firm*—Sughrue, Mion, Zinn, Macpeak & Seas, PLLC

[57] ABSTRACT

The invention relates to apparatus for curing an object by using UV radiation, the object being made, at least in part, of a material that is cross-linkable under UV radiation, said apparatus including: UV radiation sources (2); a tube (3) made of a material that is permeable to UV radiation, the tube being surrounded by the UV radiation sources (2), and being designed to receive at least a portion of the object to be cured; and gas feed means for generating a gas flow (15) through the tube (3) along a general flow axis (9). According to the invention, the apparatus further includes channeling means (4) for causing a portion (16) of the gas flow (15) to constitute a gas screen sweeping the inside sidewall (5) of the tube (3).

9 Claims, 2 Drawing Sheets

APPARATUS FOR CURING BY UV RADIATION

The invention relates to apparatus for curing an object by using UV radiation, the object being made, at least in part, of a material that is cross-linkable.

The invention relates more particularly to apparatus for curing objects by using UV radiation in an oxygen-free atmosphere, where such objects are, for example, optical fibers coated with coloring ink that is cross-linkable by means of UV radiation, or ribbons of optical fibers coated with resin that is cross-linkable by means of UV radiation.

Known apparatus using UV radiation for curing objects made, at least in part, of a material that is cross-linkable by UV radiation may include a UV oven, a tube made of a material that is permeable to UV radiation, which tube is disposed in the UV oven and is designed to receive at least a portion of the object to be cured, and means for generating an oxygen-free gas flow through the tube.

Such apparatus in particular makes continuous curing possible, i.e. the optical fiber or ribbon can be displaced continuously through the tube, the speed of advance being calculated so that the portions subjected to the UV radiation are suitably cured between the time at which they enter the tube, and the time at which they leave it. For this purpose, such apparatus includes means for continuously feeding the tube with the non-cured portions of the object to be cured, and means for continuously unloading the cured portions of the object to be cured from the tube.

The temperature of the portions of the object subjected to UV radiation increases. An evaporation/condensation phenomenon then occurs in which a portion of the cross-linkable material evaporates, and then, as it rises, it cools and condenses, thereby forming soot. The soot is then deposited on the inside sidewall of the tube, thereby significantly affecting the permeability of the tube to UV radiation.

Another drawback with known apparatus lies in the fact that the gas flow is not uniform inside the tube. As a result, the position of the object to be cured in the tube is disturbed, and this hinders good cross-linking.

An object of the present invention is to provide apparatus for curing by UV radiation, which apparatus includes means for increasing the life-span of the tube by reducing the amount of soot deposited on the inside wall of the tube.

Another object of the present invention is to provide apparatus for curing by UV radiation, which apparatus includes means for reducing soot formation.

Another object of the present invention is to provide apparatus for curing by UV radiation, which apparatus includes means for limiting disturbances to the position of the object to be cured.

To these ends, the invention provides apparatus for curing an object by using UV radiation, the object being made, at least in part, of a material that is cross-linkable under UV radiation, said apparatus including: UV radiation sources; a tube made of a material that is permeable to UV radiation, the tube being surrounded by the UV radiation sources, and being designed to receive at least a portion of the object to be cured; and gas feed means for generating a gas flow through the tube. According to the invention, the apparatus further includes channeling means for causing a portion of the gas flow to constitute a gas screen sweeping the inside sidewall of the tube, at least during curing.

The channeling means comprise a sparger disk having a through central bore and an outer concentric ring of through peripheral openings, the sparger disk being placed concentrically at the upstream end of the tube and perpendicular to the gas flow axis.

The through peripheral openings may be through circular bores extending tangentially to the inside sidewall of the tube.

Each of the through peripheral bores may have a sloping axis that slopes relative to the flow axis, and that is parallel to a plane tangential to the periphery of the disk facing the through peripheral bore in question.

The sloping axis of each the peripheral bores forms an angle of about 45° with the flow axis.

According to another characteristic of the invention, the sparger disk includes an inner concentric ring of through openings, which ring is situated in the vicinity of the central bore.

The openings in the inner ring may be through circular bores having respective axes that are parallel to the flow axis, and that extend tangentially to the perimeter of the central bore.

A first advantage of the present invention is constituted by the gas screen sweeping the inside side-surface of the tube. This limits soot deposition on the inside wall of the tube. Advantageously, the gas screen sweeps helically because the axes of the bores in the sparger disk slope.

Numerous advantages of the present invention result from the inner ring of through holes. This inner ring generates a secondary flow for regulating the main flow passing through the central bore. This makes it possible to limit the variations in position of the object to be cured, and to increase the speed of the gas flow in the vicinity of the object to be cured, thereby improving cooling of the object to be cured and thereby limiting the soot-generating evaporation/condensation phenomenon.

Other characteristics and advantages of the present invention appear from the following description given with reference to the accompanying drawings, in which.

Figure 1:
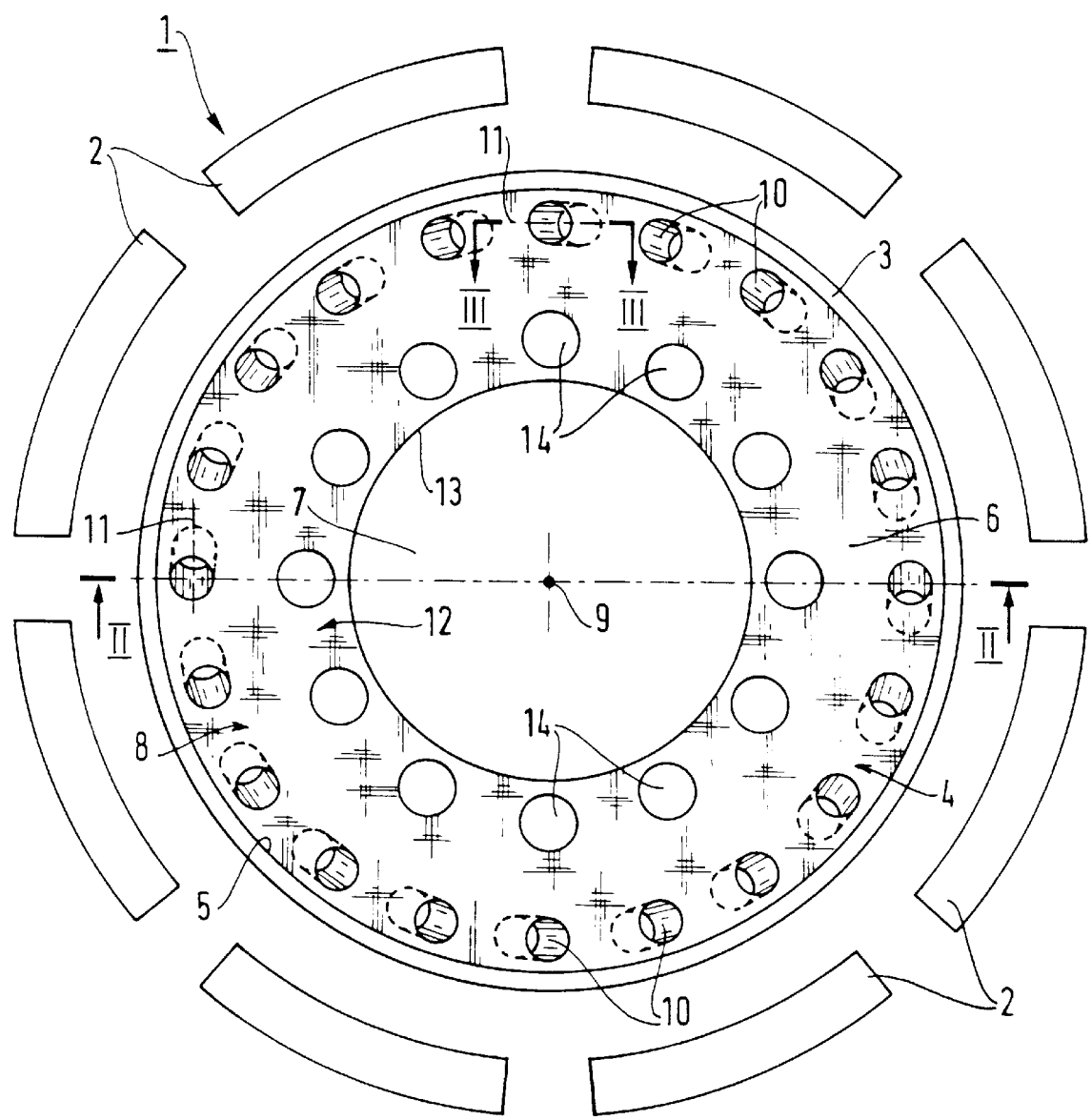
FIG. 1 is a diagrammatic cross-section view of apparatus of the invention.
Figure 2:
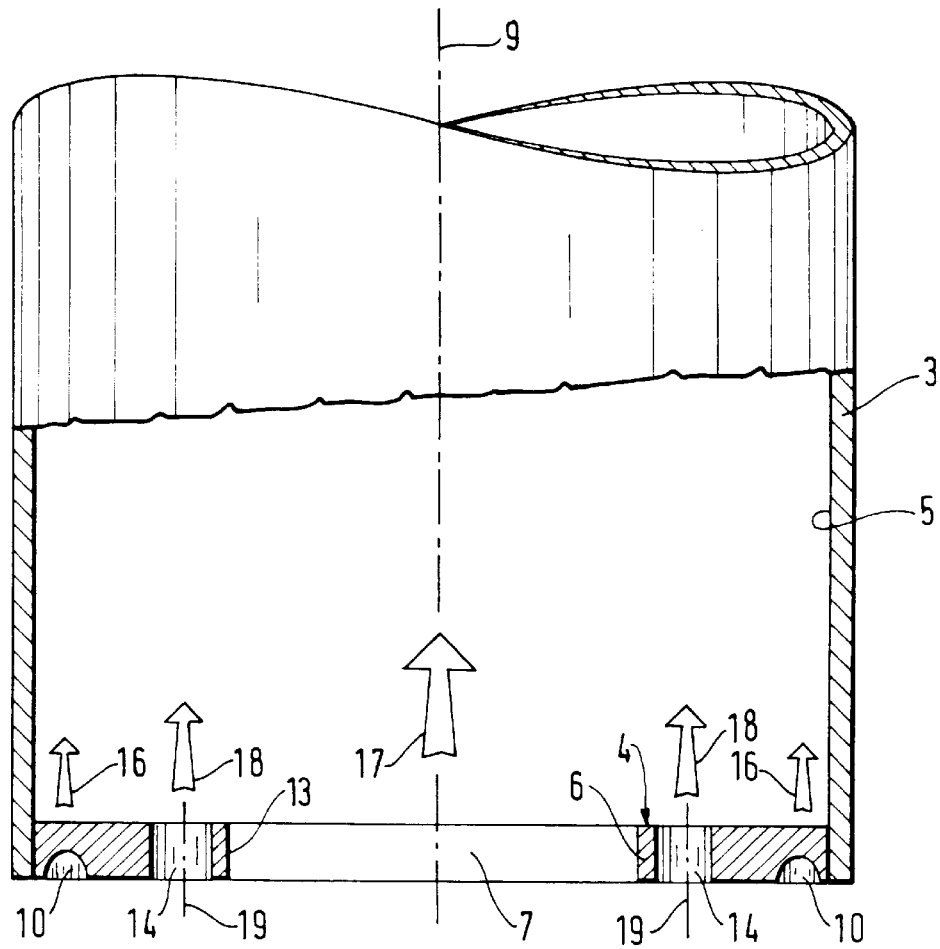
FIG. 2 is a diagrammatic section view on line II—II shown in FIG. 1.
Figure 2:
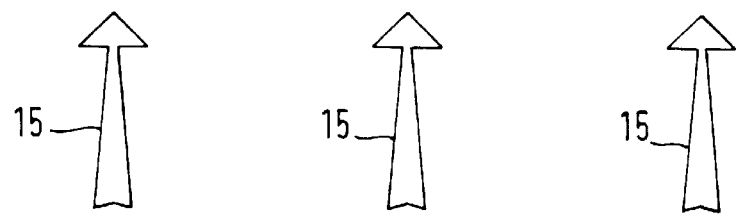
Figure 3:
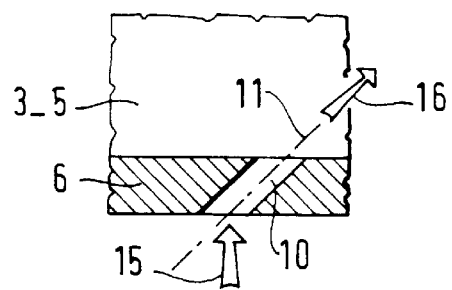
FIG. 3 is a diagrammatic section view on line III—III shown in FIG. 1.

In known manner, the apparatus of the invention for curing an object by using UV radiation, the object being made, at least in part, of a material that is cross-linkable under UV radiation, includes UV radiation sources 2 surrounding a tube 3 made of a material that is permeable to UV radiation. By way of non-limiting example, the tube may be a quartz tube. The tube 3 is designed to receive at least a portion of the object to be cured. The apparatus also includes, in known manner, gas feed means (not shown) for generating a gas flow 15 through the tube 3 along a general flow axis 9. The apparatus also includes means (not shown) for continuously feeding the tube with non-cured portions of the object to be cured, and means for continuously unloading cured portions of the object to be cured from the tube.

According to the invention, the apparatus further includes channeling means 4 for causing a portion 16 of the gas flow 15 to constitute a gas screen sweeping the inside sidewall 5 of the tube 3.

In the embodiment shown in the figures, the channeling means 4 comprise a sparger disk 6 provided with a through central bore 7 and with an outer concentric ring 8 of through peripheral openings 10. The sparger disk 6 is placed at the upstream end of the tube 3 and perpendicular to the general axis 9 of the gas flow 15.

The through peripheral openings 10 may be through circular bores 10 extending tangentially to the inside sidewall 5 of the tube 3.

Each of the through peripheral bores 10 may have a sloping axis 11 that slopes relative to the general flow axis 9.

Advantageously, the sloping axis 11 of each the peripheral bores 10 forms an angle of about 45° with the general flow axis 9.

According to another characteristic of the invention, the sparger disk 6 includes an inner concentric ring 12 of through openings 14, which ring is situated in the vicinity of the central bore 7.

The openings 14 in the inner ring 12 may be through circular bores 12 having respective axes 19 that are parallel to the general flow axis 9, and that extend tangentially to the perimeter 13 of the central bore 7.

The gas flow is thus split into a main flow 17 through the through central bore 7, a peripheral flow 16 through the through peripheral openings 10 in the outer ring 8, and a secondary flow 18 through the through openings 14 in the inner concentric ring 12.

The peripheral flow 16 constitutes a gas screen that sweeps the inside sidewall 5 of the tube 3.

Advantageously, when the peripheral bores 10 have sloping axes 11, the peripheral flow 16 forms a gas screen in the vicinity of the sidewall, which screen moves helically and in the same general direction as the general flow axis 9.

The secondary flow 18 surrounds the main flow 17.

A first advantage of the present invention is constituted by the gas screen 16 sweeping the inside sidewall 5 of the tube 3. This limits soot deposition on the inside sidewall 5 of the tube 3. Advantageously, the gas screen sweeps helically because the axes 11 of the peripheral bores 10 in the sparger disk 6 slope.

Numerous advantages of the present invention result from the inner ring 12 of through holes 14.

This inner ring 12 generates the secondary flow 18 for regulating the main flow 17 passing through the central bore 7.

This makes it possible to limit the variations in position of the object to be cured, and to increase the speed of the gas flow 17 in the vicinity of the object to be cured, thereby improving cooling of the object to be cured that is subjected to UV radiation, and thereby limiting the soot-generating evaporation/condensation phenomenon.

By way of non-limiting example, the objects to be cured may be optical fibers coated with coloring ink that is cross-linkable under UV radiation, or a plurality of optical fibers placed side-by-side and coated with a resin that is cross-linkable under UV radiation so as to form an optical ribbon.

We claim:

1. Apparatus for curing an object by using UV radiation, said object being made, at least in part, of a material that is cross-linkable under UV radiation, said apparatus comprising: UV radiation sources (2); a tube (3) made of a material that is permeable to UV radiation, said tube being surrounded by the UV radiation sources (2), and being designed to receive at least a portion of an object to be cured; gas feed means for generating a gas flow (15) through the tube (3) along a general flow axis (9); and a sparger disk (6) placed at the upstream of the tube (3) and perpendicular to a general flow axis (9), said sparger disk (6) comprising a central bore (7) through which flows a main part (17) of said gas flow (15) for atmosphere control around said object and an outer concentric ring (8) of through peripheral openings (10) through which flows a secondary part (16) of said gas flow (15) for cleaning of inside wall of the reaction chamber.

2. Apparatus according to claim 1, characterized in that it includes means for continuously feeding the tube (3) with non-cured portions of the object to be cured, and means for continuously unloading cured portions of the object to be cured from the tube (3).

3. Apparatus according to claim 2, characterized in that the object to be cured is an optical fiber coated with a colored ink that is cross-linkable under UV radiation.

4. Apparatus according to claim 2, characterized in that the object to be cured is a plurality of optical fibers coated with a resin that is cross-linkable under UV radiation.

5. Apparatus according to claim 1, characterized in that the through peripheral openings (10) are through circular bores (10) extending tangentially to the inside sidewall (5) of the tube (3).

6. Apparatus according to claim 5, characterized in that each of the through peripheral bores (10) has a sloping axis (11) that slopes relative to the general flow axis (9).

7. Apparatus according to claim 6, characterized in that the sloping axis (11) of each the peripheral bores (10) forms an angle of about 45° with the general flow axis (9).

8. Apparatus according to claim 1, characterized in that the sparger disk (6) includes an inner concentric ring (12) of through openings (14), which ring is situated in the vicinity of the central bore (7).

9. Apparatus according to claim 8, characterized in that the openings (14) in the inner ring (12) are through circular bores (12) having respective axes (19) that are parallel to the general flow axis (9), and that extend tangentially to the perimeter (13) of the central bore (7).

* * * * *